(12) United States Patent
Fiello

(10) Patent No.: US 12,103,264 B2
(45) Date of Patent: Oct. 1, 2024

(54) PLEATED FILTER PREPARATION SYSTEM

(71) Applicant: K&N Engineering, Inc., Riverside, CA (US)

(72) Inventor: Jonathan Richard Fiello, Yucaipa, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 18/196,983

(22) Filed: May 12, 2023

(65) Prior Publication Data

US 2023/0278308 A1 Sep. 7, 2023

Related U.S. Application Data

(63) Continuation of application No. 17/476,296, filed on Sep. 15, 2021, now Pat. No. 11,660,834, which is a continuation of application No. 16/270,522, filed on Feb. 7, 2019, now Pat. No. 11,123,946.

(51) Int. Cl.
*B31D 5/00* (2017.01)
*B01D 46/00* (2022.01)
*B01D 46/52* (2006.01)

(52) U.S. Cl.
CPC ....... *B31D 5/0082* (2013.01); *B01D 46/0001* (2013.01); *B01D 46/522* (2013.01)

(58) Field of Classification Search
CPC . B01D 29/012; B01D 46/521; B01D 46/0001
See application file for complete search history.

(56) References Cited

U.S. PATENT DOCUMENTS

| | | | | |
|---|---|---|---|---|
| 4,181,070 A | * | 1/1980 | Robbins | B31D 5/0082 |
| | | | | 493/379 |
| 4,288,278 A | | 9/1981 | Hisataro | |
| 4,798,575 A | * | 1/1989 | Siversson | B65H 45/20 |
| | | | | 493/347 |
| 5,064,598 A | * | 11/1991 | Seiler | B31F 1/20 |
| | | | | 425/336 |
| 5,376,218 A | * | 12/1994 | Mito | B29C 66/43 |
| | | | | 156/499 |
| 5,622,583 A | * | 4/1997 | Ernst | B65H 45/30 |
| | | | | 156/271 |
| 6,165,242 A | * | 12/2000 | Choi | B01D 29/012 |
| | | | | 55/497 |

(Continued)

*Primary Examiner* — Eyamindae C Jallow
(74) *Attorney, Agent, or Firm* — Rutan & Tucker LLP; Hani Z. Sayed

(57) ABSTRACT

A pleated filter preparation system is provided for accurately counting pleats along a continuous sheet of pleated filter material and cutting the sheet into filter strips to be formed into filters. The pleated filter preparation system includes a pleat driver having multiple drive gears that engage with the pleats of the pleated filter material to move the pleated filter material through the system. A pleat counter counts peaks and valleys of each pleat comprising the pleated filter material so as to identify a target pleat to be cut. The pleat counter clamps and stretches the target pleat to distinguish the target pleat among the other pleats. A punch cut station cuts the target pleat to form a filter strip having a desired number of pleats. A pleat compressor compresses the filter strips to a predetermined size and then ejects the filter strips into a suitable container or bin.

20 Claims, 12 Drawing Sheets

(56) References Cited

U.S. PATENT DOCUMENTS

| | | | |
|---|---|---|---|
| 6,290,635 B1* | 9/2001 | Demmel | B01D 46/0001 |
| | | | 493/360 |
| 7,097,684 B2* | 8/2006 | Choi | B01D 29/111 |
| | | | 210/493.5 |
| 7,261,288 B2* | 8/2007 | Hosoya | B42C 1/12 |
| | | | 270/32 |
| 2014/0235419 A1* | 8/2014 | Lise | B01D 46/0001 |
| | | | 493/405 |
| 2015/0114191 A1* | 4/2015 | Roehrig | A47J 43/0716 |
| | | | 83/14 |
| 2020/0078718 A1* | 3/2020 | Wick | B01D 46/523 |

* cited by examiner

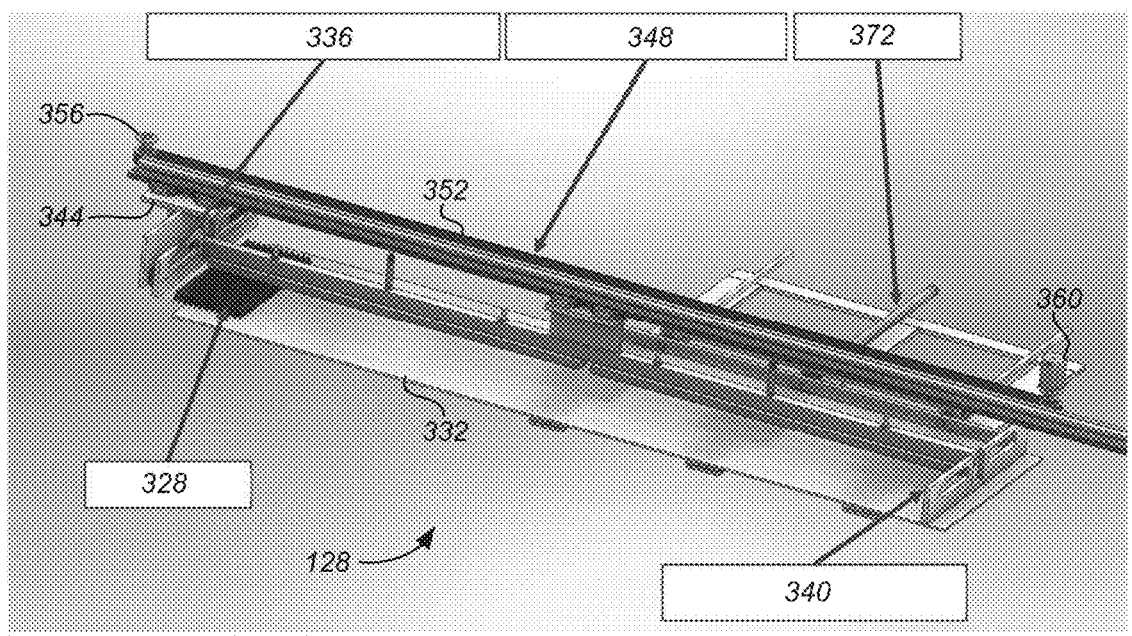
FIG. 7A
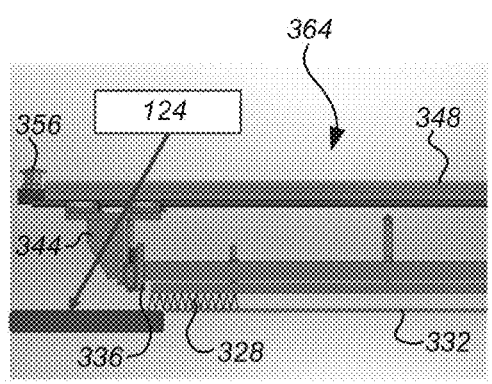 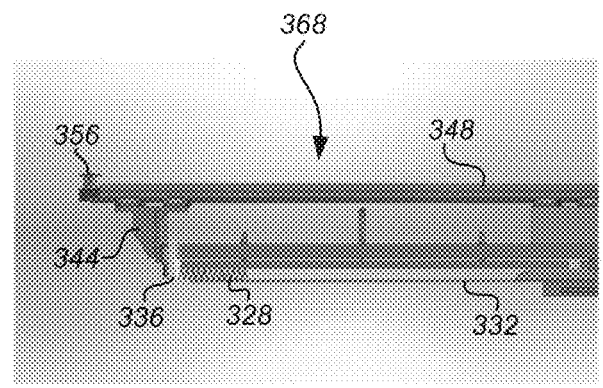
FIG. 7B          FIG. 7C

PLEATED FILTER PREPARATION SYSTEM

CROSS-REFERENCE

This application is a continuation of and claims benefit to U.S. patent application Ser. No. 17/476,296 filed on Sep. 15, 2021 and U.S. patent application Ser. No. 16/270,522 filed on Feb. 7, 2019, issued as U.S. Pat. No. 11,123,946 on Sep. 21, 2021 and which applications are incorporated herein by reference in their entirety.

FIELD

Embodiments of the present disclosure generally relate to the field of manufacturing filtration devices. More specifically, embodiments of the disclosure relate to systems and methods for a pleated filter preparation system that accurately counts the number of pleats in a corrugated sheet of material to be used for the production of air filters.

BACKGROUND

An air filter designed to remove particulate matter from an airstream generally is a device comprising fibrous materials. These fibrous materials may remove solid particulates such as dust, pollen, mold, and bacteria from the airstream. Air filters are used in applications where air quality is important, notably in building ventilation systems and with engines.

Air filters may be used in automobiles, trucks, tractors, locomotives and other vehicles that use internal combustion engines. Air filters may be used with gasoline engines, diesel engines, or other engines that utilize fossil fuels or other combustible substances. Air filters may be used with engines in which combustion is intermittent, such as four-stroke and two-stroke piston engines, as well as other types of engines that take in air continuously so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally, the air filters used with internal combustion engines and compressors tend to be comprised of either: paper, foam, or cotton filters. Air filters for internal combustion engines prevent abrasive particulate matter from entering the engine's cylinders, where it would cause mechanical wear and oil contamination. In many fuel injected engines, a flat panel pleated paper filter element may be used.

Air filters may be manufactured from a continuous roll of pleated material. It is essential that assembled air filters have a predetermined number of pleats. For example, suppose an air filter is to be tapered. A manufacturer may calculate the number of pleats needed by taking into consideration the size of the air filter and the height of the pleat. A piece of material that includes the desired number of pleats may be cut from the roll. Once cut, the piece of material may be joined at its ends to form a sleeve which is then formed into a filter medium of the air filter.

Along an assembly line, the desired number of pleats generally is counted manually and marked at each interval where the desired number repeats on the roll. The roll is then manually cut at the marked intervals to form filter media comprising the desired number of pleats. In the case of round air filters, for example, the ends of each piece of material are manually joined together and then crimped together to form a filter medium suitable for being formed into a round air filter.

As will be appreciated, manually counting pleats, marking intervals along the roll, and manually cutting the at the marked intervals not only is time consuming, but is also subject to error. The likelihood of such errors generally is increased by the tedious nature of the job. If the number of pleats is improperly counted, a faulty air filter will result. A need exists, therefore, for a pleat counter that accurately counts the number of pleats in a corrugated sheet of material to be used for the production of air filters.

SUMMARY

A pleated filter preparation system and methods are provided for accurately counting pleats along a continuous sheet of pleated filter material and cutting the sheet into filter strips to be formed into filters. The pleated filter preparation system comprises a pleat driver configured to move the pleated filter material through the system. The pleat driver includes one or more drive gears that are configured to engage with a pleat height comprising the pleated filter material so as to convey the pleated filter material through the system. The pleated filter preparation system includes a pleat counter configured to count peaks and valleys of each pleat comprising the pleated filter material so as to identify a target pleat to be cut. The pleat counter is configured to clamp the pleated filter material and stretch the target pleat to distinguish the target pleat among the other pleats. A punch cut station configured to located and cut the target pleat to form a filter strip having the desired number of pleats. A conveyor is configured to transport filter strips from the punch cut station to a pleat compressor. The pleat compressor is configured to compress filter strips to a predetermined size and then eject the compressed filter strips into a suitable container or bin.

In an exemplary embodiment, a pleated filter preparation system comprises: a pleat driver configured to move a pleated filter material through the system; a pleat counter configured to identify a target pleat to be cut; a punch cut station configured to cut the target pleat to form a filter strip; and a pleat compressor configured to compress the filter strip to a predetermined size.

In another exemplary embodiment, the pleated filter preparation system further includes a feed entrance configured to guide the pleated filter material from a pay-out into the pleat driver, the pay-out comprising one or more rolls of pleated filter material to be processed by the system. In another exemplary embodiment, the feed entrance includes side rails that are configured to move to optimally guide different widths of the pleated filter material into the pleat driver.

In another exemplary embodiment, the pleated filter preparation system further includes a conveyor disposed between the punch cut station and the pleat compressor, the conveyor being configured to transport filter strips from the punch cut station to the compressor. In another exemplary embodiment, the conveyor is configured to move each of the filter strips onto a filter support comprising the pleat compressor. In another exemplary embodiment, the conveyor is configured to transport the filter strips at a speeds that emulate feed rates of the pleat drive.

In another exemplary embodiment, the pleat drive includes a pleat height index comprising a vertically oriented disc having one or more drive gears disposed around the periphery of the disc, the drive gears being free to rotate with respect to the pleat height index. In another exemplary embodiment, the drive gears each includes peripheral teeth configured to engage with a pleat height comprising the pleated filter material so as to convey the pleated filter material through the system. In another exemplary embodiment, the drive gears each include a pulley portion configured to receive a drive belt whereby a drive motor turns all of the drive gears simultaneously. In another exemplary embodiment, a tensioner is configured to maintain an optimal belt tension during operation of the drive gears. In another exemplary embodiment, the pleat height index includes a suitable engagement driver configured to move the pleat height index vertically to an indexing configuration. In another exemplary embodiment, the indexing configuration comprises the pleat height index being raised to disengage a bottom-most of the one or more drive gears from the pleated filter material. In another exemplary embodiment, the indexing configuration of the pleat height index is configured to facilitate switching to a different bottom-most of the one or more drive gears so as to engage with a differently-sized pleated filter material.

In another exemplary embodiment, the pleat counter includes a sensor disposed above the pleated filter material and a pleat detector disposed underneath the pleated filter material, the sensor and the pleat detector being configured to identify and count peaks and valleys comprising each of the pleats comprising the pleated filter material. In another exemplary embodiment, the sensor and the pleat detector are configured to identify the target pleat to be cut. In another exemplary embodiment, the pleat counter is configured to clamp the pleat filter material and stretch the target pleat so as to distinguish the target pleat among the other pleats.

In another exemplary embodiment, the punch cut station includes a stamping press configured to cut the pleated filter material at the midpoint of the target pleat. In another exemplary embodiment, the punch cut station is coupled with a sensor configured to detect the location of the target pleat. In another exemplary embodiment, the stamping press includes an elongate stamping die in mechanical communication with a hydraulic actuator, the stamping die being a single blade positioned parallel with the target pleat, the hydraulic actuator being configured to forcibly press the stamping die into the midpoint of the target pleat.

In another exemplary embodiment, the pleat compressor includes an ejector configured to push a compressed filter strip onto a fall arrestor adjacent to the pleat compressor, the fall arrestor being configured to support the compressed filter strip in a horizontal orientation. In another exemplary embodiment, the fall arrestor is configured to quickly retract such that the compressed filter strip maintains the horizontal orientation during dropping into a suitable container or bin.

BRIEF DESCRIPTION OF THE DRAWINGS

The drawings refer to embodiments of the present disclosure in which:

FIG. 7A illustrates an exemplary embodiment of a pleat compressor that may be incorporated into the pleated filter preparation system of FIG. 1;

FIG. 7B illustrates a filter receiving configuration of the pleat compressor shown in FIG. 7A, wherein the pleat compressor receive a filter strip to be compressed;

FIG. 7C illustrates a filter compression configuration of the pleat compressor shown in FIG. 7A, wherein the pleat compressor is beginning to compress the filter strip;

Figure 1:
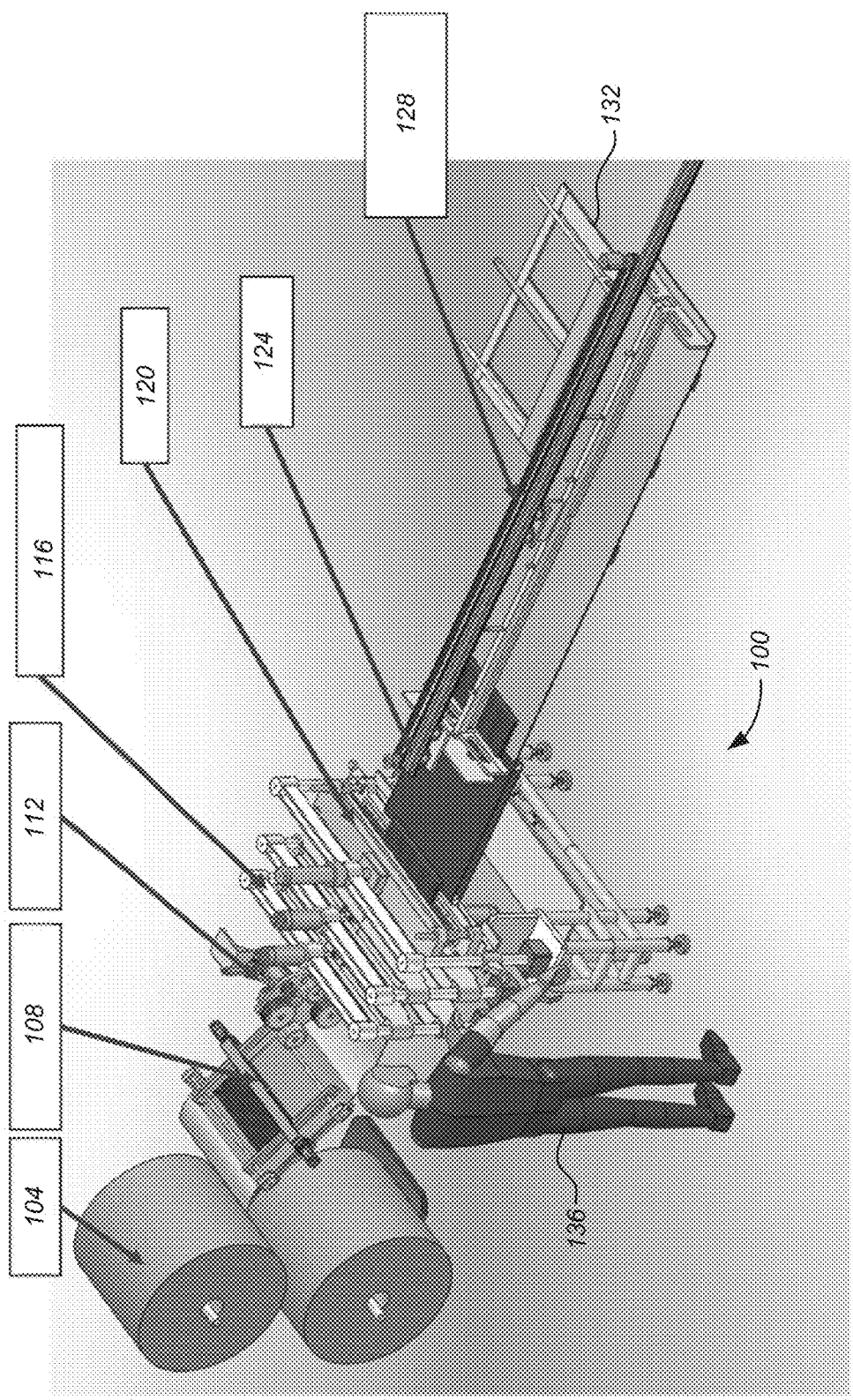
FIG. 1 illustrates a perspective view of an exemplary embodiment of a pleated filter preparation system according to the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first pleat," may be made. However, the specific numeric reference should not be interpreted as a literal sequential order but rather interpreted that the "first pleat" is different than a "second pleat." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Air filters may be manufactured from a continuous roll of pleated material. It is essential that assembled air filters have a predetermined number of pleats. Along an assembly line, the desired number of pleats may be counted and marked at each interval where the desired number of pleats repeats along the roll. Manually counting pleats is time consuming prone to error. If the number of pleats is improperly counted, a faulty air filter will result. Embodiments presented herein below provide a pleat counter capable of accurately counting a desired number of pleats in a corrugated sheet of filter material.

FIG. 1 illustrates a perspective view of an exemplary embodiment of a pleated filter preparation system 100 (hereinafter, "system 100"), according to the present disclosure. The system 100 is configured to automate counting pleats along a continuous roll of pleated material, cutting the roll into desired length strips of pleated material based on the number of counted pleats, compressing the strips of pleated material, and packing the strips in preparation for being formed into air filters. As shown in FIG. 1, the system 100 includes a pay-out 104, feed entrance 108, a pleat drive 112, a pleat counter 116, a punch cut station 120, a conveyor 124, a pleat compressor 128, and a fall arrestor 132. In general, the system 100 is configured to produce a desired spectrum of filter configurations without requiring manual intervention. It is envisioned, however, that an operator 136 may manually configure portions of the system 100, such as, for example, changing a stamping die comprising the punch cut station 120.

Figure 1A:
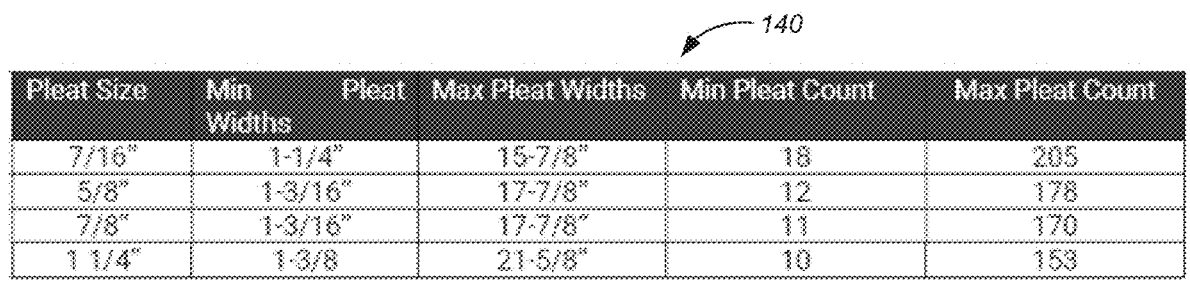
FIG. 1A illustrates a table showing a multiplicity of filter property-ranges that may be accommodated by way of the pleated filter preparation system of FIG. 1.

As stated, the system 100 is configured to advantageously produce a desired spectrum of filter configurations. FIG. 1A illustrates a table 140 showing a multiplicity of filter property-ranges that may be accommodated by way of the system 100. For example, the system 100 may produce filters having pleat widths ranging between about 1¼" to about 21⅝". Desired pleat counts generally range between about 18 pleats and 153 pleats. Table 140 further shows desired pleat sizes, or pleat heights, that may be accommodated by the system 100, such as ⁷⁄₁₆", ⅝", ⅞", and 1¼". It should be understood, however, that the system 100 is not limited to producing filters strictly in accordance with the filter properties shown in table 140, but rather the system 100 is capable of producing filters having properties other than those shown in FIG. 1A. For example, in some embodiments, the system 100 is configured to produce filters having a pleat height that is less than ⁷⁄₁₆", such as, by way of non-limiting example, a pleat height of ⁵⁄₁₆". Further, in some embodiments, the system 100 is configured to produce filters having a pleat height that is greater than 1¼", such as, by way of non-limiting example, a pleat height of 1⅜". Moreover, in some embodiments, the system 100 may be configured to operate with filter materials having metric properties, without limitation.

Figure 2:
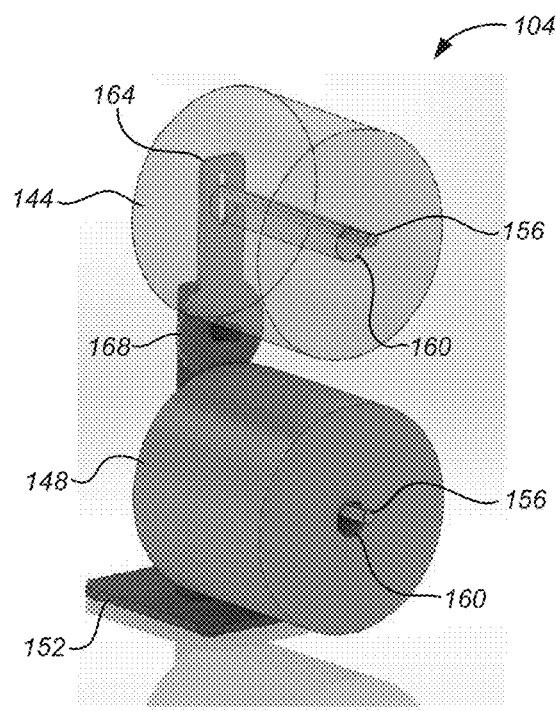
FIG. 2 illustrates an isometric view of an exemplary embodiment of a pay-out that may be used in conjunction with the pleated filter preparation system shown in FIG. 1.

FIG. 2 illustrates an isometric view of an exemplary embodiment of a pay-out 104 that may be used in conjunction with the system 100 shown in FIG. 1. In general, the pay-out 104 comprises one or more rolls of filter material to be processed by the system 100 to form filters. In the embodiment of FIG. 2, the pay-out 104 includes a first spool 144 and a second spool 148 of rolled filter materials that are supported vertically with respect to one another on a stand 152. The spools 144, 148 are each supported by way of a support post 156 extending horizontally through a hole 160 disposed in the center of the spool. The support posts 156 are fixed to opposite ends of a pay-out arm 164 that is rotatably attached to the stand 152 by way of a pivot 168. As will be appreciated, the pivot 168 enables the pay-out arm 164 to be rotated with respect to the stand 152, as desired.

In some embodiments, the upper of the spools 144, 148 feeds the system 100 while the lower of the spools 144, 148 remains on standby. Once the upper of the spools 144, 148 is finished being used, or is no longer desired to be used, the pay-out arm 164 may be rotated about the pivot 164 to position the lower of the spools 144, 148 in the upper position. It is contemplated, that the pivot 168 may be operated either by way of an electric motor or manually to switch the respective positions of the spools 144, 148, as desired. It is contemplated that, in some embodiments, the spools 144, 148 may be comprised of distinctly different filter materials. For example, the first spool 144 may be comprised of filter material having a ⁷⁄₁₆" pleat height while the second spool 148 includes a filter material having ⅞" pleat height. As such, the spools 144, 148 may be switched according to the desired pleat height of the filters produced by the system 100.

Moreover, it is contemplated that the pay-out 104 may be comprised of more than the two spools 144, 148 shown in FIG. 2. In some embodiments, for example, the pay-out 104 may include three, four, five or more spools of distinctly different filter materials, without limitation. Each of the spools may include a filter material having a unique combination of the properties show in table 140. Thus, the system 100 may produce a wide variety of differently-sized filters due, in part, to switching among spools of different filter material that are loaded into the pay-out 104, without limitation.

Figure 3A:
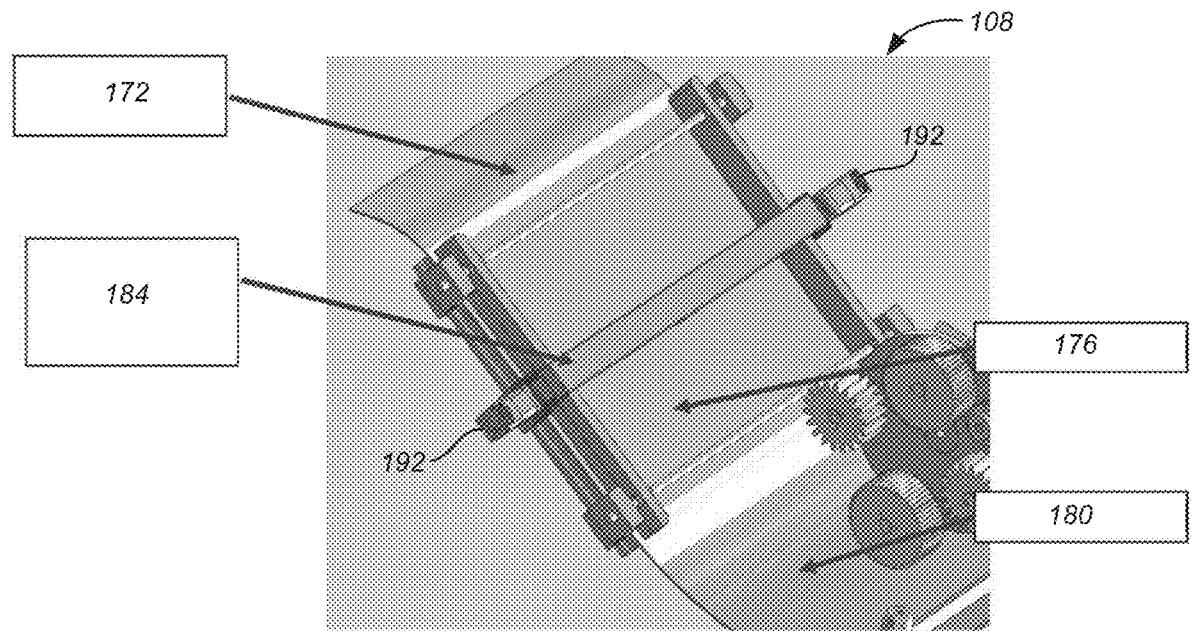
FIG. 3A illustrates an exemplary embodiment of a feed entrance that may be incorporated into the pleated filter preparation system of FIG. 1.

FIG. 3A illustrates an exemplary embodiment of a feed entrance 108 that may be incorporated into the system 100 of FIG. 1. The feed entrance 108 includes a smooth sheet configured to guide continuous filter material from the spool 144 into the system 100. The smooth sheet includes a rounded portion 172 near the spool 144 and comprises a flattened portion 176 within the feed entrance 108. The flattened portion 176 transitions to a curved portion 180 upon exiting the feed entrance 108 and entering the pleat drive 112. The portions 172, 176, 180 comprising the smooth sheet are configured to optimally guide the filter material into the system 100 with as little resistance as possible.

Figure 3B:
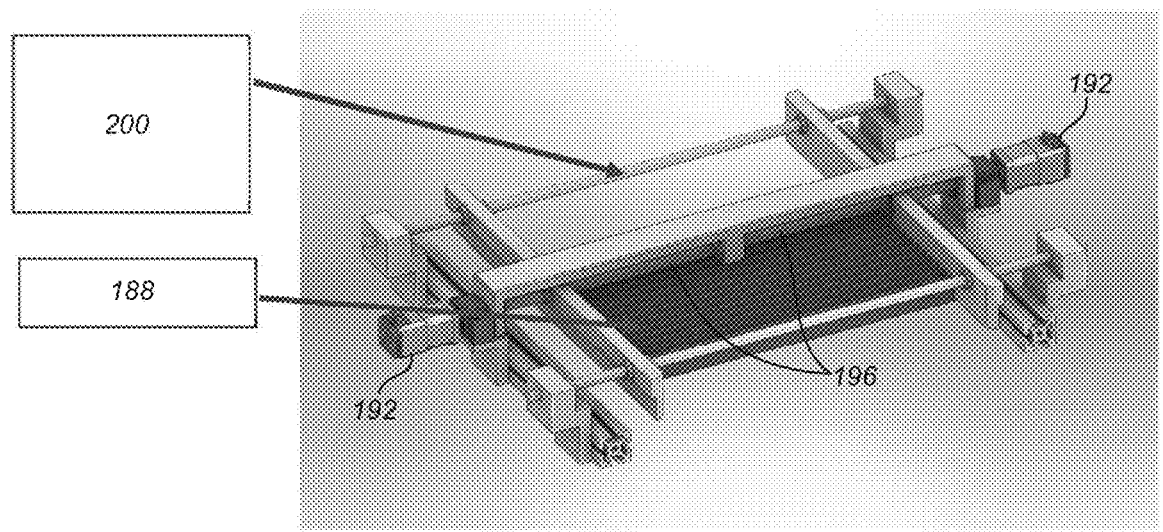
FIG. 3B illustrates the feed entrance of FIG. 3A with side rails moved adjacent to the sides of a filter material being drawn through the pleated filter preparation system of FIG. 1.

As shown in FIG. 3A, side rails 184 are disposed along opposite sides of the flattened portion 176 and are configured to move to optimally guide different widths of filter material through the system 100. As shown in FIG. 3B, for example, the side rails 184 may be moved closer together to be adjacent to the sides of a filter material 188 being drawn through the system 100. In the illustrated embodiment, each of the side rails 184 is moveable by way of a servo 192 in mechanical communication with a threaded shaft 196. Each of the side rails 184 is threadably engaged with the shaft 196, such that turning the threaded shaft 196 causes the side rail 184 to move accordingly. In the illustrated embodiment, the servos 192 are configured to move the side rails 184 from a separation distance of about 1.5" to about 22", without limitation. Further, opposite ends of each side rail 184 slidably rides on a guiderail 200. As will be recognized, the guiderails 200 are configured to keep the side rails 184 parallel to one another during width adjustments.

Figure 4A:
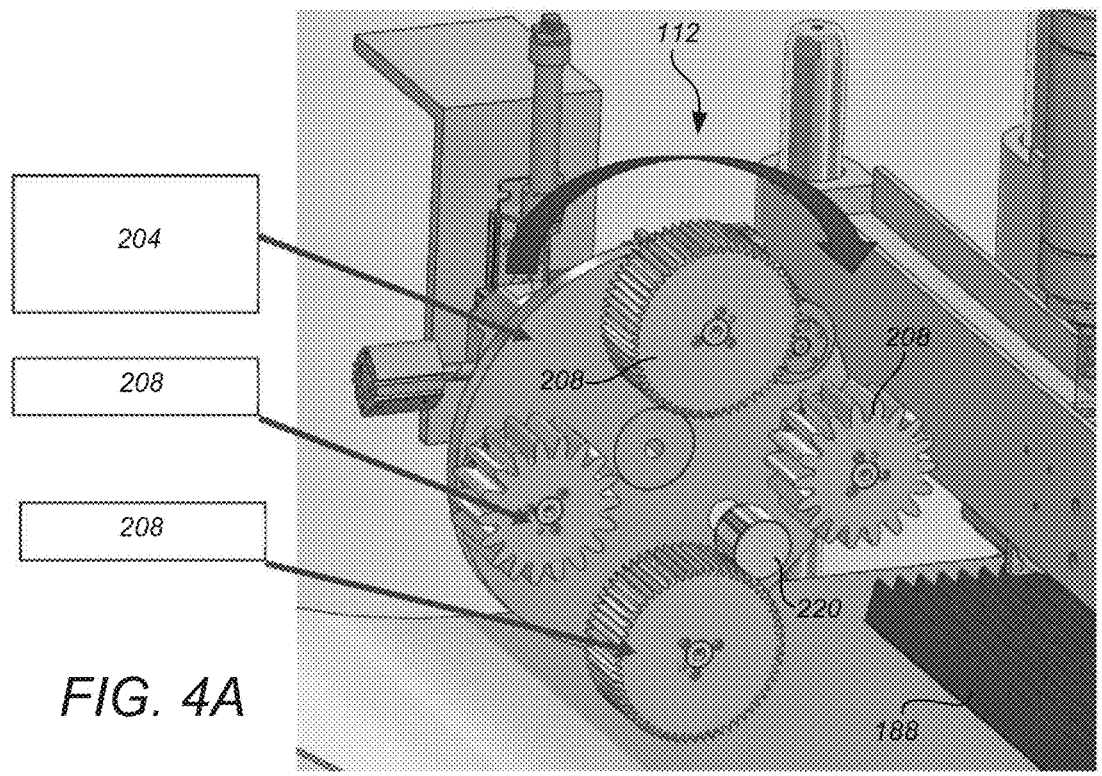
FIG. 4A illustrates an exemplary embodiment of a pleat drive comprising the pleated filter preparation system of FIG. 1.
Figure 4B:
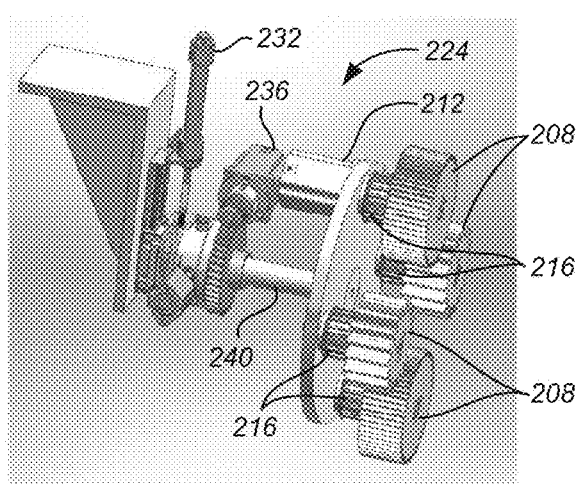
FIG. 4B illustrates the pleat drive of FIG. 4A in an exemplary engaged configuration wherein the pleat drive conveys a filter material through the pleated filter preparation system of FIG. 1.
Figure 4C:
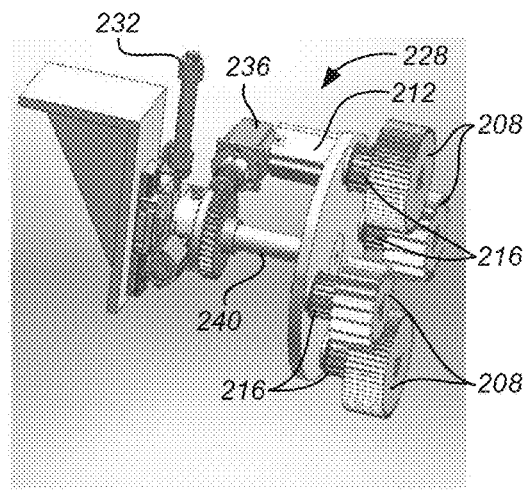
FIG. 4C illustrates the pleat drive of FIG. 4A in an exemplary indexing configuration wherein the pleat drive is disengaged from the filter material.

FIG. 4A illustrates an exemplary embodiment of a pleat drive 112 comprising the system 100 of FIG. 1. During operation of the system 100, the pleat drive 112 is configured to be automatically indexed to a correct pleat drive gear for engaging with the filter material 188. As shown in FIG. 4A, the pleat drive 112 includes a pleat height index 204 generally comprising a vertically oriented disc having one or more drive gears 208 disposed around the periphery of the disc. The drive gears 208 may be coupled with the pleat height index 204 by way of bearings, and thus each of the drive gears 208 is free to rotate with respect to the pleat height index 204. As best shown in FIGS. 4B and 4C, a drive motor 212 is configured to rotate the drive gears 208. In the illustrated embodiment, the drive gears 208 each include a pulley portion 216 configured to receive a drive belt (not shown) whereby the drive motor 212 can turn all of the drive gears 208 simultaneously. A tensioner 220 may be utilized, as shown in FIG. 4A, to maintain an optimal belt tension during operation of the drive gears 208.

Each drive gear 208 includes peripheral teeth configured to engage with a specific pleat height comprising the filter material 188 so as to convey the filter material through the system 100. As such, in the illustrated embodiment, a first drive gear 208 includes teeth configured to engage with a filter material 188 comprising pleats having a pleat height of $7/16$", while a second drive gear 208 includes teeth for engaging with pleats having a pleat height of $5/8$". Further, a third drive gear 208 has teeth configured for engaging pleats having a pleat height of $7/8$", and a fourth drive gear 208 is configured to engage with the pleats of a filter material 188 comprising a pleat height of $1\frac{1}{4}$". It is contemplated, however, that the drive gears 208 may be configured to engage with pleat heights other than those shown in FIG. 1A. For example, a drive gear 208 configured to engage with a $5/16$" pleat height, or other specific dimension, may be installed onto the pleat height index 204, without limitation. It is further contemplated that the drive gears 208 may be configured to engage with metric pleat heights, without limitation.

In general, the pleat height index 204 is configured to be moved vertically between an engaged configuration 224, shown in FIG. 4B, and an indexing configuration 228 shown in FIG. 4C. The pleat height index 204 may be moved vertically by way of a suitable engagement driver 232, such as a linear servo or an electric motor. In the engaged configuration 224 of FIG. 4B, the pleat height index 204 is lowered to advantageously couple the bottom-most drive gear 208 with the filter material 188. In the indexing configuration 228, however, the pleat height index 204 is raised to disengage the bottom-most drive gear 208 from the filter material 188. It is contemplated that the indexing configuration 228 facilitates moving a different drive gear 208 to the bottom-most position so as to engage with a differently-sized filter material 188. An index motor 236 in mechanical communication with an axle 240 of the pleat height index 204 is configured to rotate the pleat height index 204 so as to change the vertical positions of the drive gears 208 with respect to the filter material 188. Once the desired drive gear 208 is in the bottom-most position, the engagement driver 232 may be used to lower the pleat height index 204 to the engaged configuration 224, as shown in FIG. 4B. The drive motor 212 may then be actuated to draw the filter material 188 through the system 100, as described herein.

Figure 5:
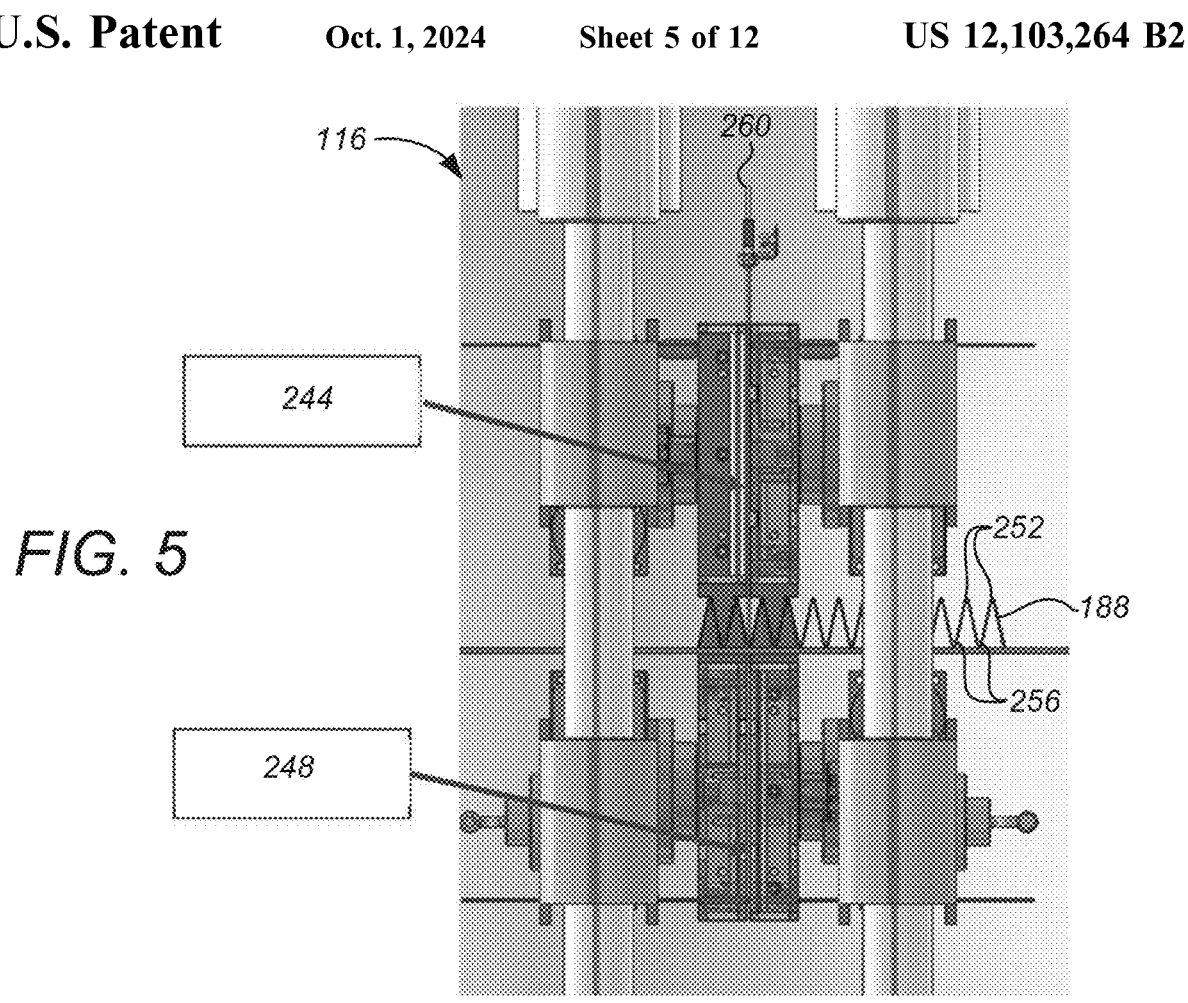
FIG. 5 illustrates a side plan view of an exemplary embodiment of a pleat counter comprising the pleated filter preparation system of FIG. 1.

It will be appreciated that a critical part of separating the filter material 188 into strips suitable for being formed into filters is counting the number of pleats comprising each of the strips and then stretching the pleats where the strips are to be cut from the filter material 188. To this end, FIG. 5 illustrates a side plan view of an exemplary embodiment of a pleat counter 116 comprising the system 100 of FIG. 1. The pleat counter 116 is shown clamping a portion of the filter material 188. A first sensor 244 is disposed above the filter material 188, and a pleat detector 248 is disposed underneath the filter material 188. The first sensor 244 and the pleat detector 248 are configured to identify and count peaks 252 and valleys 256 comprising each of the pleats comprising the filter material 188. It is contemplated that the first sensor 244 and the pleat detector 248 may include any of various detectors suitable for distinguishing between the peaks 252 and the valleys 256, such as, by way of non-limiting example, reflective digital laser sensors and the like. In the embodiment of FIG. 5, for example, a laser 260 and the first sensor 244 are disposed substantially in the center of the pleat counter 116 and configured to detect the pleats that are to be cut.

It should be understood that the various sensors and detectors disclosed herein, such as the first sensor 244 and the pleat detector 248, generally are an I/O variety of sensor that facilitates a bi-directional flow of information to and from each sensor. As will be appreciated, I/O sensors advantageously enable troubleshooting of problem areas, while allowing for easy configuration of the sensors without requiring physical changes based on estimation. As such, the I/O sensors enable an authorized operator 136 to control and calibrate sensor values without having to physically calibrate the sensors during maintenance or optimization. All calibrations can be done either in person or remotely, thereby giving other authorized users multiple ways to address any issues.

Figure 5D:
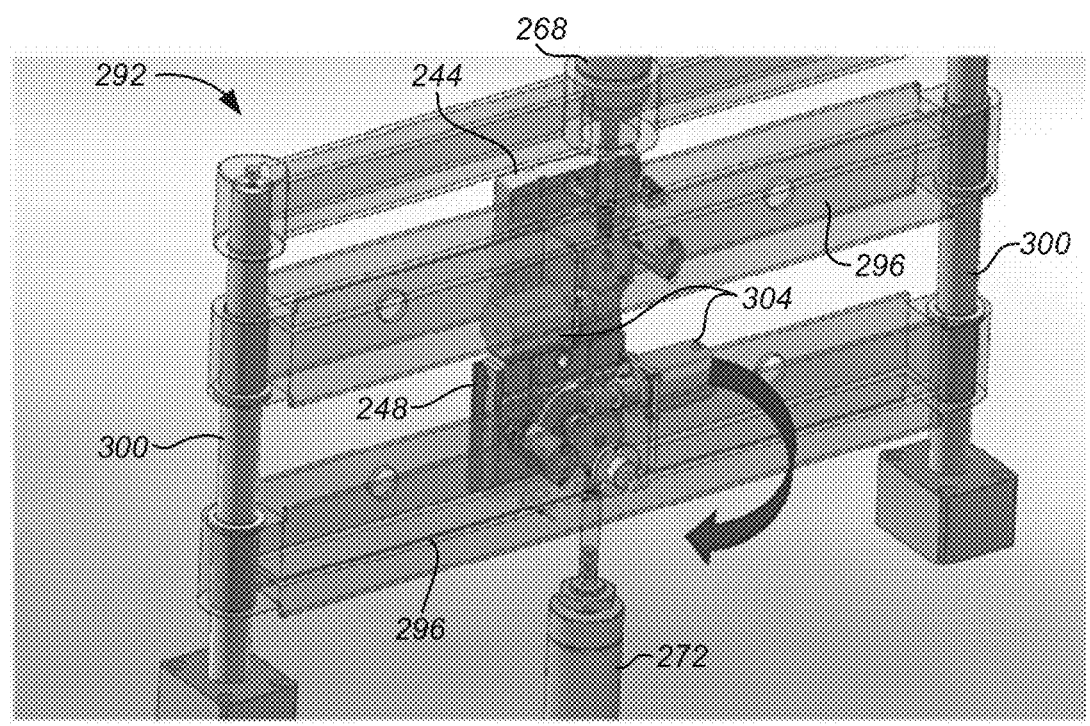
FIG. 5D illustrates an exemplary pleat height index configuration of the pleat counter shown in FIG. 5, whereby the pleat counter may be adjusted to accommodate different pleat heights of the filter material.
Figure 5A:
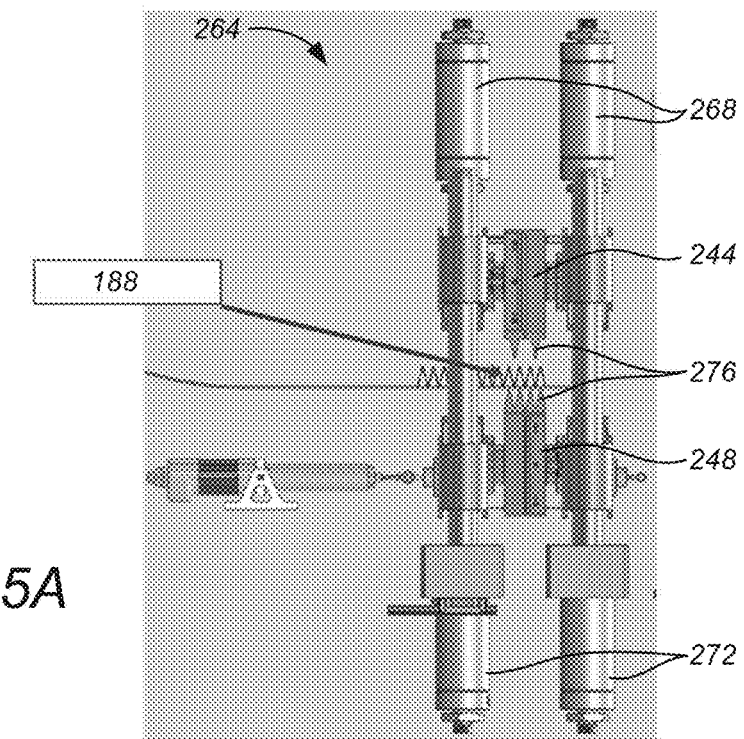
FIG. 5A illustrates the pleat counter of FIG. 5 in a pleat location configuration whereby pleats of a filter material are counted and a pleat to be cut is identified.
Figure 5B:
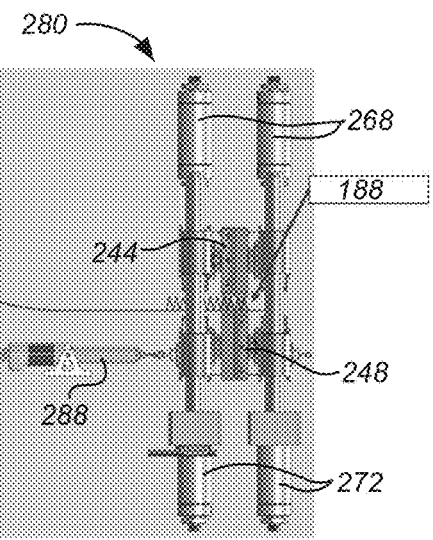
FIG. 5B illustrates the pleat counter of FIG. 5 in a pleat clamping configuration wherein the filter material is clamped by way of teeth extending into pleats adjacent to the pleat to be cut.
Figure 5C:
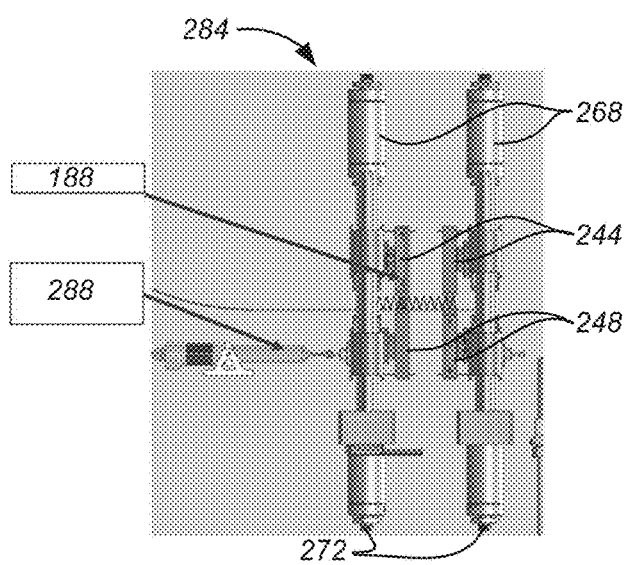
FIG. 5C illustrates the pleat counter of FIG. 5 in a pleat stretching configuration wherein the pleat to be cut is marked by way of stretching to distinguish the pleat to be cut from other pleats comprising the filter material.

FIGS. 5A through 5C illustrate exemplary configurations of the pleat counter 116 during pleat counting, pleat clamping, and pleat stretching. FIG. 5A illustrates the pleat counter 116 in a pleat location configuration 264 whereby the pleats of the filter material 188 may be counted and the pleat to be cut may be identified. In the pleat location configuration 264, the first sensor 244 and the pleat detector 248 are separated away from the filter material 188 to allow free movement of the filter material 188 therethrough during counting the pleats. Servo cylinders 268 are configured to move the first sensor 244 above the filter material 188, and servo cylinders 272 are configured to lower the pleat detector 248 below the filter material 188. As further shown in FIG. 5A, the first sensor 244 and the pleat detector 248 include teeth 276 configured to extend into adjacent pleats during clamping the filter material 188.

FIG. 5B illustrates the pleat counter 116 in a pleat clamping configuration 280 wherein the servo cylinders 268, 272 have moved the first sensor 244 and the pleat detector 248 together so as to extend the teeth 276 into adjacent pleats. The pleat counter 116 is moved into the pleat clamping configuration 280 once the desired number of pleats have been counted and the pleat to be cut has been located. In the illustrated embodiment, the teeth 276 engage the filter material 188 such that the pleat to be cut is located in the center of the first sensor 244. In some embodiments, however, the pleat counter 116 may further include a secondary, "after counter" (not shown) that is configured to verify that the desired number of pleats has been correctly counted. As such, it is contemplated that the teeth 276 engage the filter material 188 only once the after counter has confirmed that the correct number of pleats has been counted.

FIG. 5C illustrates the pleat counter 116 in a pleat stretching configuration 284 wherein the pleat to be cut is marked by way of stretching to distinguish the pleat to be cut from other pleats comprising the filter material 188. In the embodiment illustrated in FIG. 5C, the teeth 276 remain extended into the pleats adjacent to the pleat to be cut while the first sensor 244 and the pleat detector 248 are each separated into halves that are pulled apart by way of a servo cylinder 288. As will be appreciated, separating the halves of the first sensor 244 and the pleat detector 248 while the teeth 276 remain engaged with the pleats operates to stretch the pleat to be cut without alternating the pleats adjacent to the stretched pleat. It is contemplated that the stretched pleat may be later detected by a second sensor and then cut by way of the punch cut station 120, as shown in FIG. 1.

FIG. 5D illustrates an exemplary pleat height index configuration 292 of the pleat counter 116 whereby the separation between the first sensor 244 and the pleat detector 248 may be adjusted to accommodate different pleat heights of the filter material 188. As shown, the first sensor 244 and the pleat detector 248 are mounted onto cross members 296 that may be moved vertically along posts 300 under the action of respective servo cylinders 268, 272, as described herein. Further, it is contemplated that the first sensor 244 and the pleat detector 248 may be moved horizontally along the cross members 296 by way of electric motors 304. It should be understood, therefore, that the pleat counter 116 is configured to process all desired pleat heights comprising the filter material 188, without limitation.

Figure 6A:
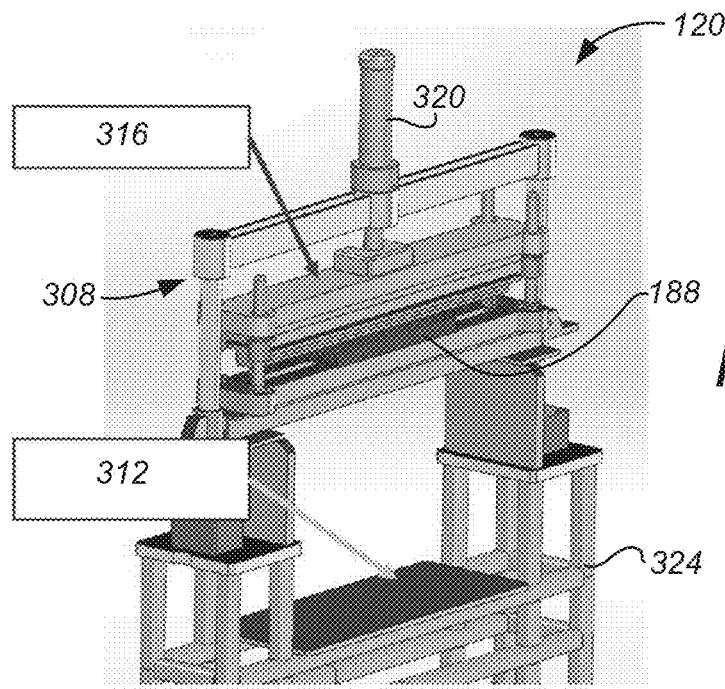
FIG. 6A illustrates a first isometric view of an exemplary embodiment of a punch cut station that may be incorporated into the pleated filter preparation system of FIG. 1.
Figure 6B:
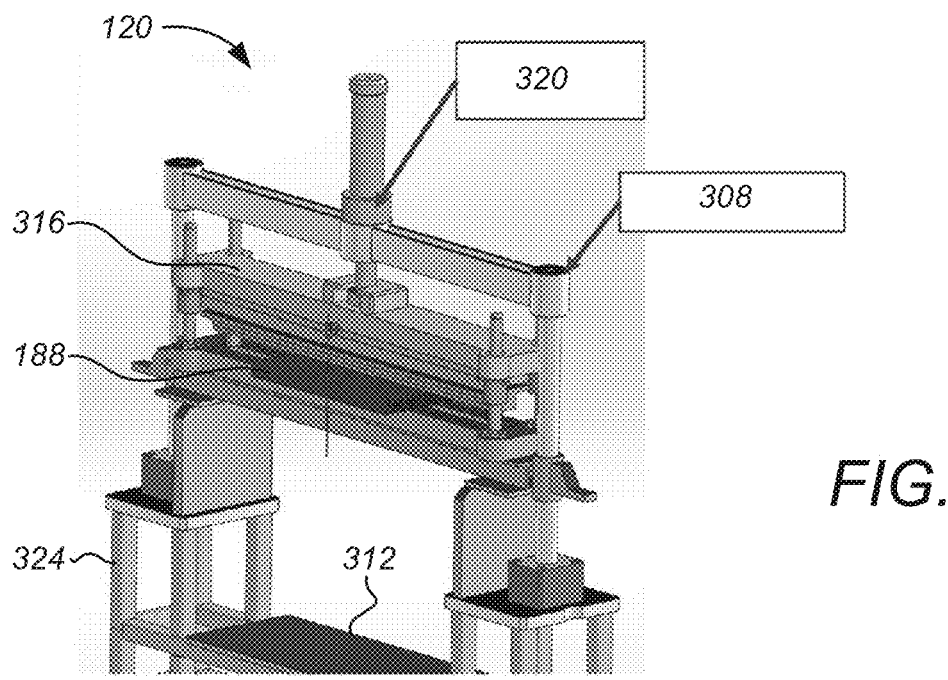
FIG. 6B illustrates a second isometric view of an exemplary embodiment of a punch cut station that may be incorporated into the pleated filter preparation system of FIG. 1.

FIGS. 6A and 6B illustrate isometric view of an exemplary embodiment of a punch cut station 120 that may be incorporated into the system 100 of FIG. 1. The punch cut station 120 generally is configured to cut the filter material 188 into filter strips having a desired number of pleats, as described herein. In some embodiments, a second sensor (not shown) that is similar to the first sensor 244 may be coupled with the punch cut station 120 and configured to detect the stretched pleat to be cut. It is contemplated that the second sensor may be configured to detect pleat peaks 252 disposed at the beginning and end of the stretched pleat. As will be appreciated, an exact location to cut the stretched pleat may be identified by dividing the detected stretch length in half relative to the known pleat height and current feed rate.

In the embodiment illustrated in FIGS. 6A and 6B, the punch cut station 120 includes a stamping press 308 configured to cut the filter material 188. A waste catch 312 located below the stamping press 308 is configured to capture scraps of the filter material 188 that may be produced during cutting. The stamping press 308 includes an elongate stamping die 316 in mechanical communication with a hydraulic actuator 320. The stamping die 316 generally includes a single blade positioned parallel with the pleats and preferably is capable of cutting all pleat widths comprising the filter material 188. The hydraulic actuator 320 is configured to forcibly press the stamping die 316 into the midpoint of the stretched pleat, as detected by the second sensor described herein. As further shown in FIGS. 6A and 6B, the punch cut station 120 is coupled with a support structure 324 suitable for supporting the weight of the punch cut station 120 and incorporating the punch cut station 120 within the system 100, as shown in FIG. 1.

Once the filter material 188 has been cut into strips, the resulting filter strips 328 are transported from the punch cut station 120 to a pleat compressor 128, shown in FIG. 7A, by way of the conveyor 124 shown in FIG. 1. The conveyor 124 is configured to move each filter strip 328 onto a filter support 332 comprising the pleat compressor 128. It is contemplated that the conveyor 124 is configured to transport the filter strips 328 at a speed, including acceleration and deceleration, that emulates the feed rate of the pleat drive 112, such that the filter material 188 and the filter strips 328 move through the system 100 with a substantially constant velocity.

As shown in FIG. 7A, the pleat compressor 128 generally is an elongate assembly configured to compress filter strips 328 to a desired size and then eject the compressed filter strips 328 into a suitable container or bin. As will be appreciated, the filter support 332 has a width capable of supporting all desired pleat widths of the filter material 188, as discussed with respect to table 140. A compression plate 336 is disposed at a first end of the filter support 332, near the conveyor 124. The compression plate 336 is configured to slide an arriving filter strip 328 along the filter support 332 towards a fixed plate 340 disposed at a second end of the filter support 332. Preferably, therefore, the filter support 332 includes a relatively smooth surface suitable for sliding the filter strips 328 thereon. Upon contacting the fixed plate 340, the compression plate 336 compresses the filter strip 328 against the fixed plate 340 until the filter strip 328 assumes a predetermined size. An ejector 372 comprising the pleat compressor 128 is configured to move the compressed filter strip 328 off the filter support 332 into a suitable container or bin.

In the illustrated embodiment of FIG. 7A, the compression plate 336 is coupled with a plate carriage 344 that is configured to roll along a support rail 348 disposed above the filter support 332. The plate carriage 344 is fixed to a belt 352 that is looped around a pulley 356 and a drive motor 360. Thus, upon actuation of the drive motor 360, movement of the belt 352 carries the plate carriage 344 along the support rail 348. It is contemplated that one or more sensors may be mounted onto various locations of the pleat compressor 128 and configured to advantageously limit the travel of the plate carriage 344 along the support rail 348, as desired.

FIGS. 7B and 7C illustrate exemplary configurations of the pleat compressor 128 during receiving a filter strip 328 that is to be advantageously compressed, as described herein. FIG. 7B illustrates a filter receiving configuration 364 of the pleat compressor 128 wherein the conveyor 124 pushes the filter strip 328 onto the filter support 332. While in the filter receiving configuration 364, at least one sensor (not shown) coupled with the pleat compressor 128 is used to detect a trailing edge of the filter strip 328. Once the trailing edge of the filter strip 328 is detected, the pleat compressor 128 changes to a filter compression configuration 368 as shown in FIG. 7C. Once in the filter compression configuration 368, the compression plate 336 is lowered behind the trailing edge of the filter strip 328. The pleat compressor 128 then proceeds to compress the filter strip 328, as described herein.

Figure 8A:
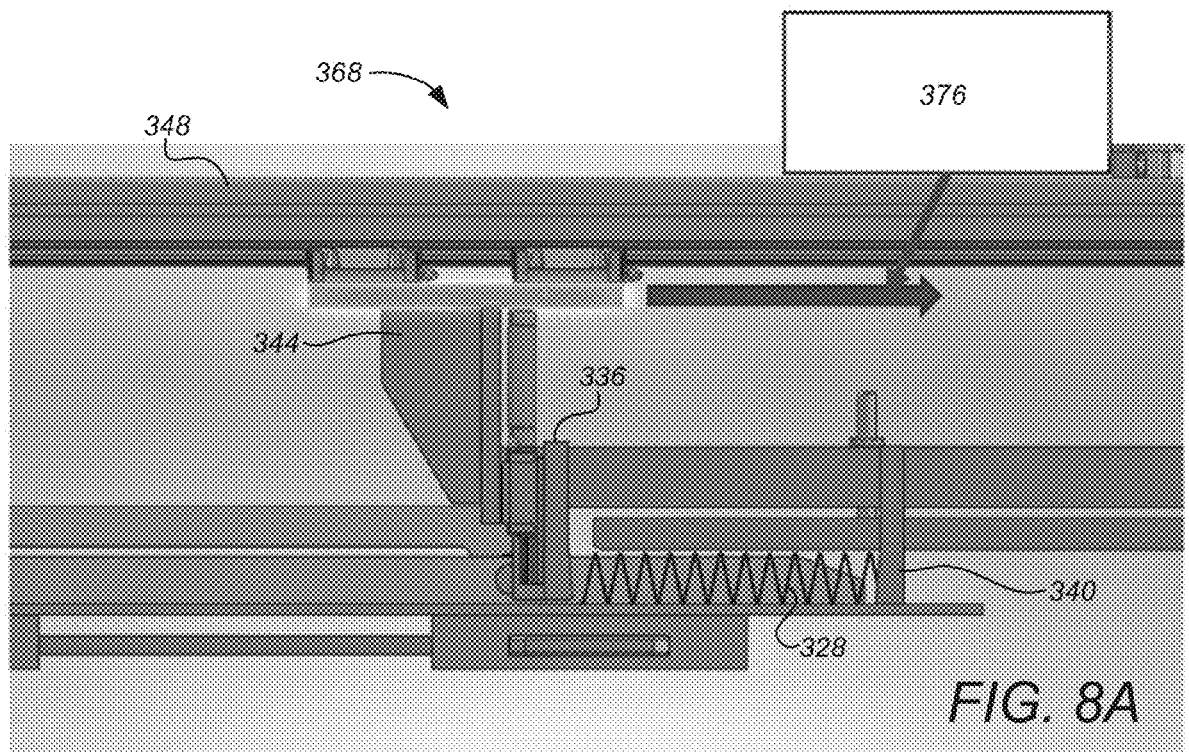
FIG. 8A illustrates a filter compression configuration of the pleat compressor of FIG. 7A during compressing a filter strip.
Figure 8B:
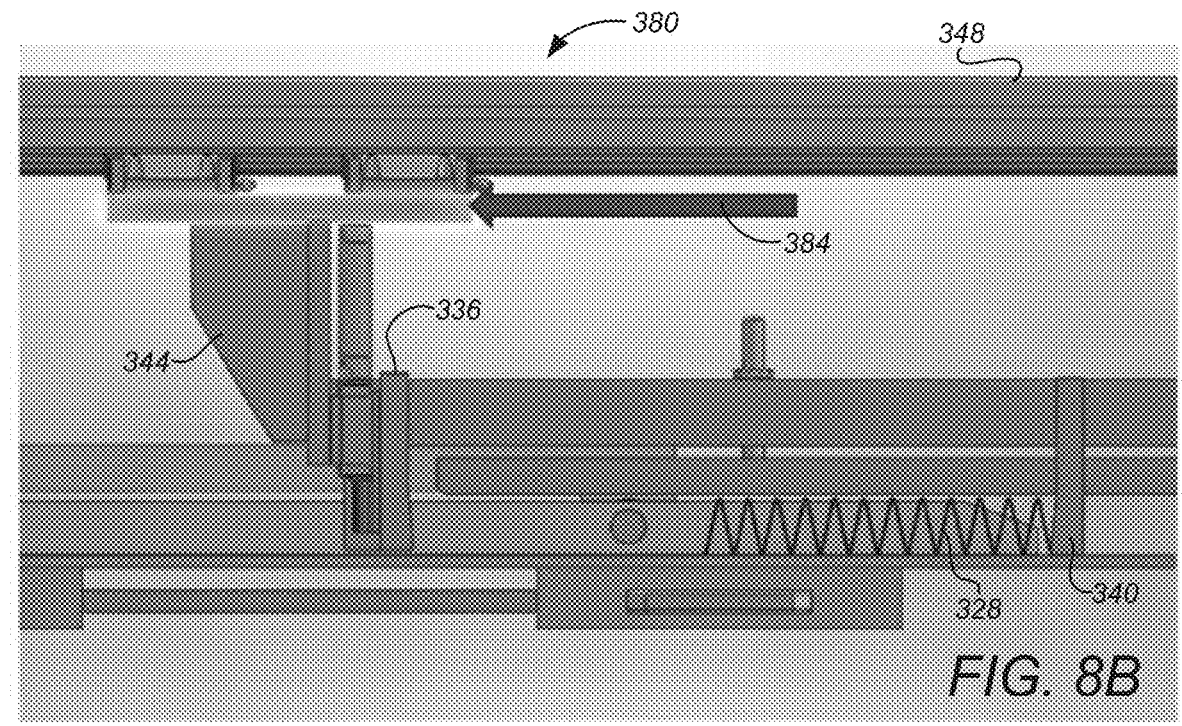
FIG. 8B illustrates a carriage retract configuration of the pleat compressor of FIG. 7A, wherein a plate carriage comprising the pleat compressor is retracted after compressing the filter strip.

FIG. 8A illustrates a filter compression configuration 368 of the pleat compressor 128 during compressing the filter strip 328. As shown in FIG. 8A, during compressing the filter strip 328 the plate carriage 344 moves along the support rail 348 in a direction 376 toward the fixed plate 340. Once the filter strip 328 contacts the fixed plate 340, the plate carriage 344 pushes the compression plate 336 against the filter strip 328 to compress the filter strip 328. Once the filter strip 328 is compressed to a predetermined size, the pleat compressor 128 changes to a carriage retract configuration 380. As shown in FIG. 8B, during the carriage retract configuration 380 the plate carriage 344 moves along the support rail 348 in a direction 384 away from the fixed plate 340. After being compressed, the filter strip 328 remains on the filter support 332 near the fixed plate 340 before being ejected from the system 100.

Figure 9A:
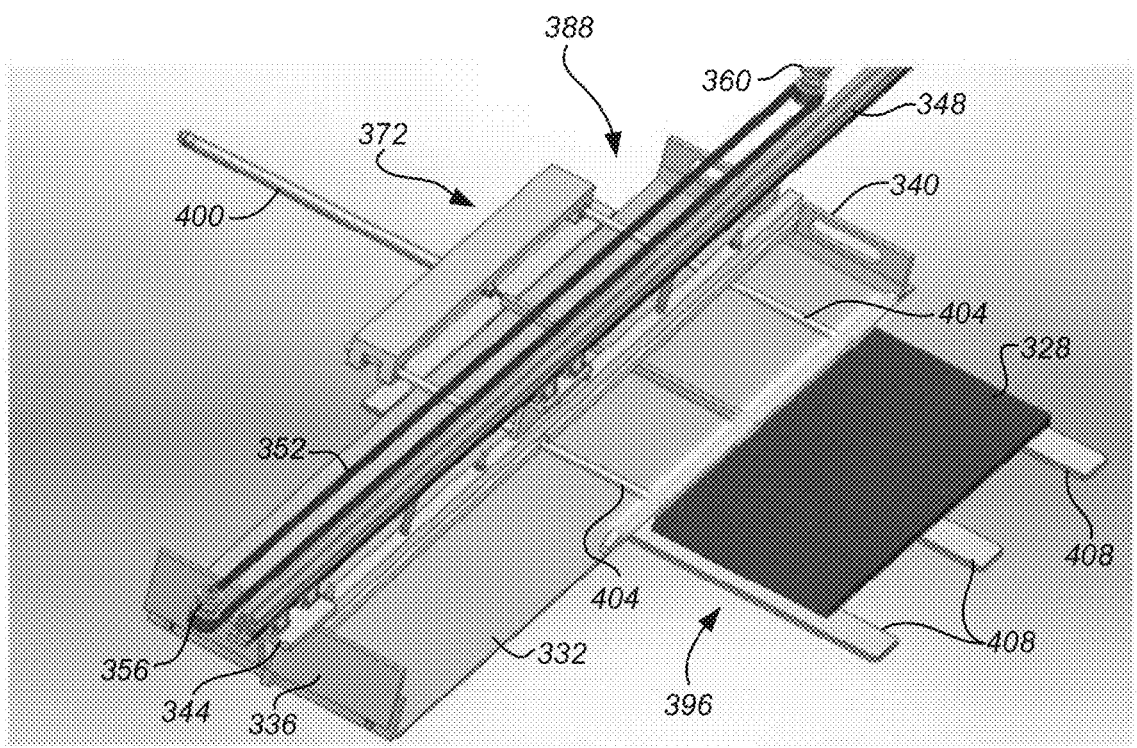
FIG. 9A illustrates an exemplary filter ejection configuration of the pleat compressor of FIG. 7A, wherein a compressed filter strip is pushed from the pleat compressor onto a fall arrestor.
Figure 9B:
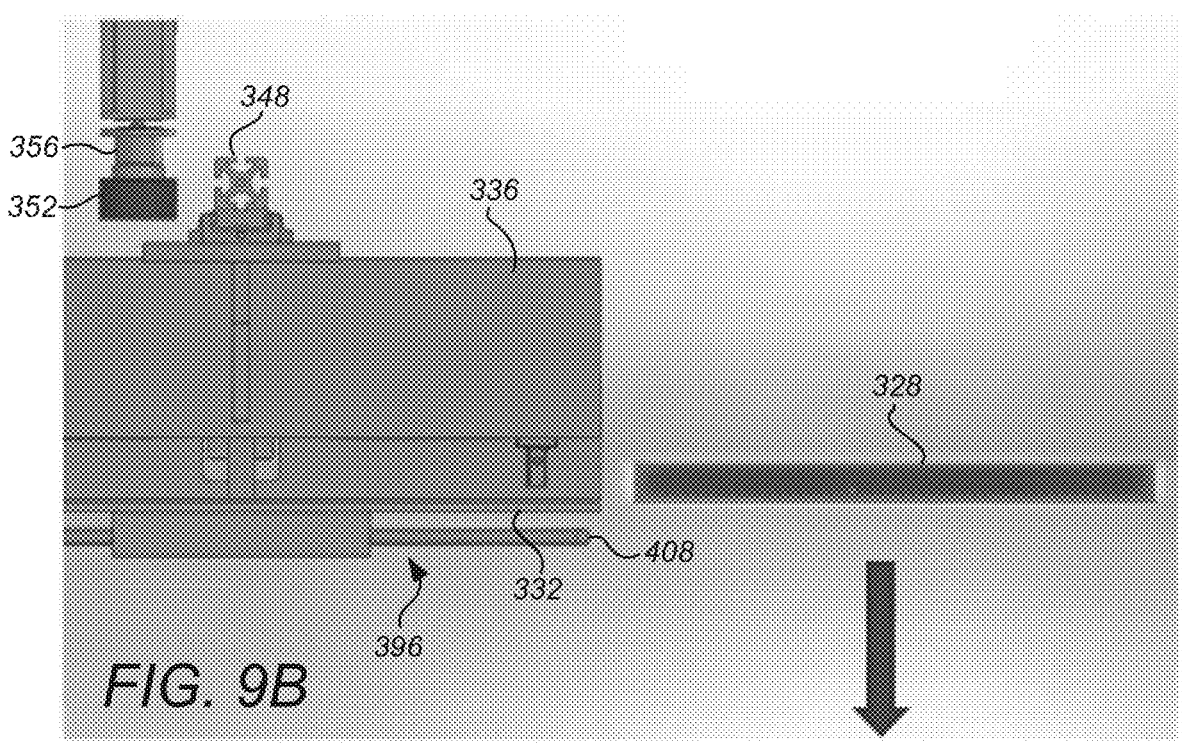
FIG. 9B illustrates an exemplary embodiment of a fall arrestor being retracted to allow the compressed filter strip to drop controllably into a container.

FIG. 9A illustrates an exemplary filter ejection configuration 388 of the pleat compressor 128. In the filter ejection configuration 388, the plate carriage 344 returns to the beginning of the filter support 332 and an ejector 372 pushes the compressed filter strip 328 off of the filter support 332 in preparation for compressing the next filter strip delivered by the conveyor 104. In the embodiment illustrated in FIG. 9A, the ejector 372 includes an elongate bar 392 configured to slide the filter strip 328 onto a fall arrestor 396 adjacent to the filter support 332. The bar 392 moves under the operation of a suitable actuator 400 and rides on parallel guiderails 404. Once the compressed filter strip 328 clears the filter support 332 and is entirely supported by the fall arrestor 396, the bar 392 is retracted away from the filter strip 328, leaving the filter strip supported entirely by the fall arrestor 396. As shown in FIG. 9A, the fall arrestor 396 generally includes multiple legs 408 that are separated so as to support the filter strip 328 in a horizontal orientation. Upon the legs 408 being retracted quickly, as shown in FIG. 9B, the filter strip 328 maintains the horizontal orientation during dropping into a suitable container or bin for storing compressed filter strips produced by the system 100. It is contemplated that the number of legs 408 and their separation may be adjusted so as to accommodate a spectrum of desired filter sizes, without limitation.

Figure 10:
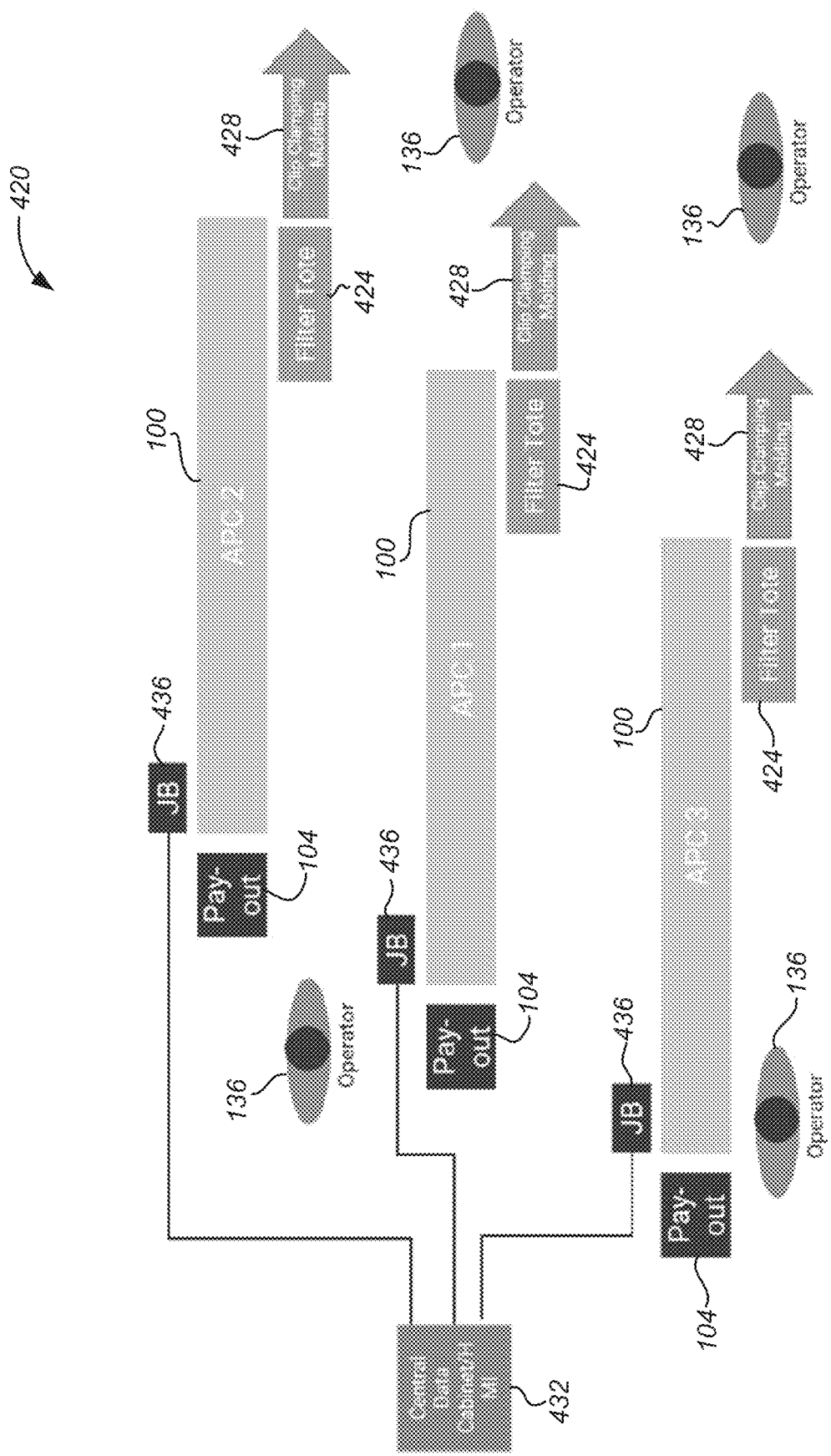
FIG. 10 illustrates a schematic of an exemplary embodiment of a pleated filter manufacturing station comprising multiple pleated filter preparation stations operating in parallel.

FIG. 10 illustrates a schematic of an exemplary embodiment of a pleated filter manufacturing station 420 that may be implemented to manufacture a multiplicity of filter strips comprising various pleat properties and sizes, as described hereinabove. In the embodiment of FIG. 10, the pleated filter manufacturing station 420 includes three systems 100 operating in parallel under the oversight of multiple operators 136. It should be understood, however, that the station 420 is not limited comprising three systems 100, but rather the station 420 may be comprised of any number of systems 100, without limitation. Each system 100 receives pleated filter material 188 to be processed by way of a pay-out 104, and deposits compressed filter strips 328 into a filter tote 424. Once the filter tote 424 is filled with compressed filter strips 328, the operator 136 may replace the filled filter tote 424 with an empty tote to continue capturing compressed filter strips 328. Further, the operator 136 may move the filled filter tote 424 to a downstream station 428, wherein the compressed filter strips 328 are formed into filters, as desired.

As shown in FIG. 10, each system 100 is coupled to a central data cabinet 432 by way of a junction box 436. The central data cabinet 432 generally comprises a programmable logic controller (PLC), or an automated PLC system, that is configured to process stored instructions and operate the systems 100 accordingly by way of the junction boxes 436. As such, the PLC incorporated into the central data cabinet 432 processes the stored instructions to cause the systems 100 to perform operations, discussed hereinabove, to form compressed filter strips 328 and deposit the strips into the filter totes 424. Further, it is contemplated that the PLC incorporated into the central data cabinet 432 is configured to allow for human interaction, such that the systems 100 may be switched into a manual operational mode. For example, in some embodiments, the central data cabinet 432 includes a Human Machine Interface (HMI), that advantageously enables an authorized operator 136 to control each of the systems 100 based on information flow to and from the above-described I/O sensors. The HMI generally includes a touch screen that visually represents operational functions and status information pertaining to the systems 100 based on data provided by the various I/O sensors coupled with the systems 100, as described herein. As will be appreciated, therefore, the touch screen comprising the HMI enables the authorized operator 136 to operate the systems 100 according to the data provided by the I/O sensors.

It is contemplated that the pleated filter manufacturing station 420 preferably is to be protected from unrestricted access by way of a safety enclosure. Such a safety enclosure may be configured to protect personnel from entering or reaching into the station 420 during operation of the systems 100. The safety enclosure may include a curtain that surrounds the station 420 or be comprised of rigid walls that include transparent panels and designated openings. In some embodiments, the safety enclosure may be configured to detect an unauthorized entry into the station 420 and may be configured to cease operation upon detecting a breach. It is envisioned that the safety enclosure may include lockable entry ways that provide safe access to the station 420 by way of any of various means for secured access, such as entry codes, keys, key cards, and the like.

Figure 11:
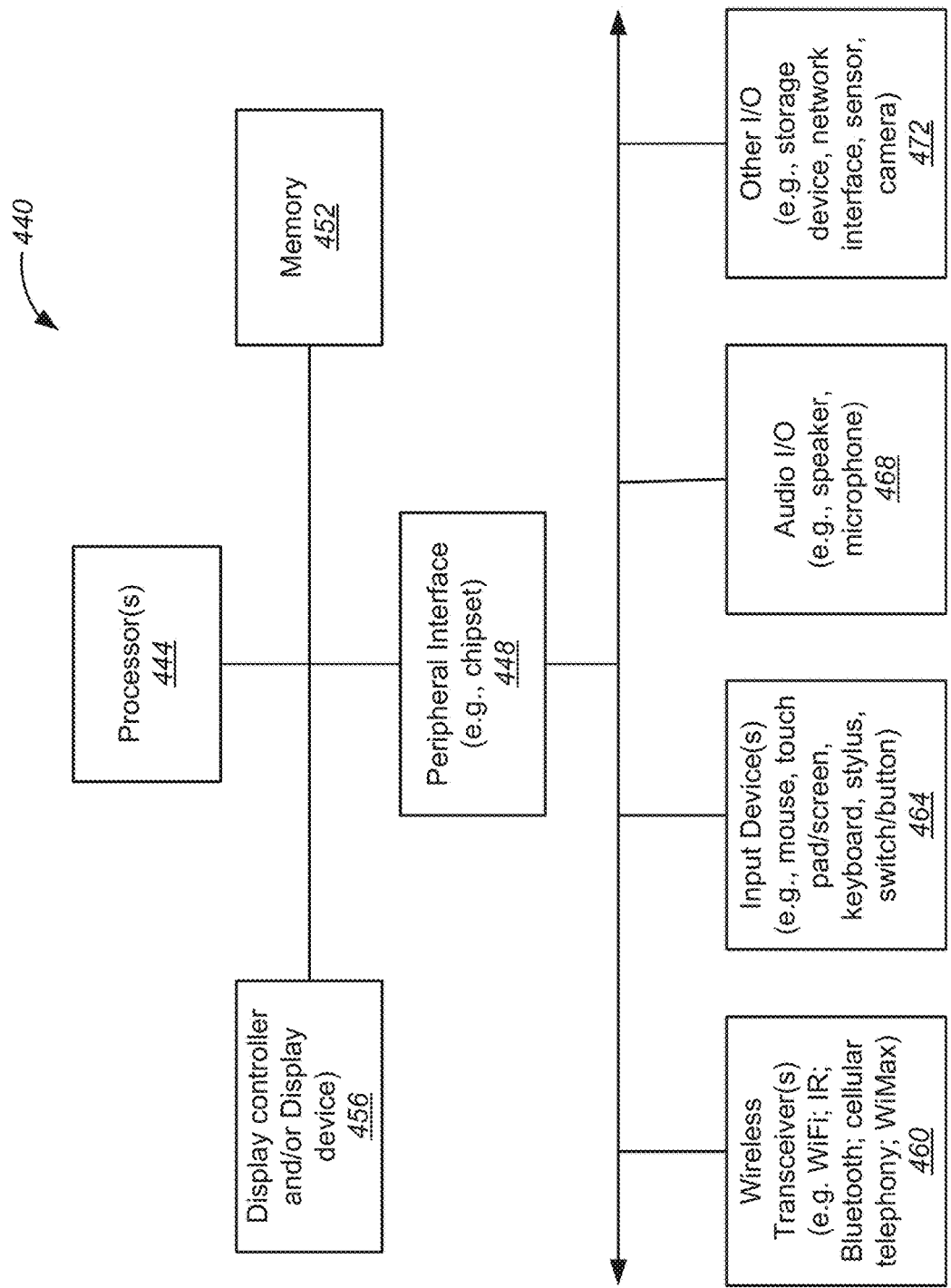
FIG. 11 is a block diagram illustrating an exemplary data processing system that may be used with an automated filter preparation system, in accordance with the present disclosure.

FIG. 11 is a block diagram illustrating an exemplary data processing system 440 that may be used with an automated filter preparation system, such as the systems 100, to perform any of the processes or methods described herein. System 440 may represent a desktop, a tablet, a server, a mobile phone, a media player, a personal digital assistant (PDA), a personal communicator, a network router or hub, a wireless access point (AP) or repeater, a set-top box, or a combination thereof.

In an embodiment, illustrated in FIG. 11, system 440 includes a processor 444 and a peripheral interface 448, also referred to as a chipset, to couple various components to the processor 444, including a memory 452 and devices 460-472 by way of a bus or an interconnect. Processor 444 may represent a single processor or multiple processors with a single processor core or multiple processor cores included therein. Processor 444 may represent one or more general-purpose processors such as a microprocessor, a central processing unit (CPU), and the like. More particularly, processor 444 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 444 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 444 is configured to execute instructions for performing the operations and steps discussed herein.

Peripheral interface 448 may include a memory control hub (MCH) and an input output control hub (ICH). Peripheral interface 448 may include a memory controller (not shown) that communicates with a memory 452. The peripheral interface 448 may also include a graphics interface that communicates with graphics subsystem 456, which may include a display controller and/or a display device. The peripheral interface 448 may communicate with the graphics device 456 by way of an accelerated graphics port (AGP), a peripheral component interconnect (PCI) express bus, or any other type of interconnects.

An MCH is sometimes referred to as a Northbridge, and an ICH is sometimes referred to as a Southbridge. As used herein, the terms MCH, ICH, Northbridge and Southbridge are intended to be interpreted broadly to cover various chips that perform functions including passing interrupt signals toward a processor. In some embodiments, the MCH may be integrated with the processor 444. In such a configuration, the peripheral interface 448 operates as an interface chip performing some functions of the MCH and ICH. Furthermore, a graphics accelerator may be integrated within the MCH or the processor 444.

Memory 452 may include one or more volatile storage (or memory) devices, such as random access memory (RAM), dynamic RAM (DRAM), synchronous DRAM (SDRAM), static RAM (SRAM), or other types of storage devices. Memory 452 may store information including sequences of instructions that are executed by the processor 444, or any other device. For example, executable code and/or data of a variety of operating systems, device drivers, firmware (e.g., input output basic system or BIOS), and/or applications can be loaded in memory 452 and executed by the processor 444. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 448 may provide an interface to I/O devices, such as the devices 460-472, including wireless transceiver(s) 460, input device(s) 464, audio I/O device(s) 468, and other I/O devices 472. Wireless transceiver 460 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 464 may include a mouse, a touch pad, a touch sensitive screen (which may be integrated with display device 456), a pointer device such as a stylus, and/or a keyboard (e.g., physical keyboard or a virtual keyboard displayed as part of a touch sensitive screen). For example, the input device 464 may include a touch screen controller coupled with a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio I/O 468 may include a speaker and/or a microphone to facilitate voice-enabled functions, such as voice recognition, voice replication, digital recording, and/or telephony functions. Other optional devices 472 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 472 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 11 illustrates various components of a data processing system, it is not intended to represent any particular architecture or manner of interconnecting the components; as such details are not germane to embodiments of the present disclosure. It should also be appreciated that network computers, handheld computers, mobile phones, and other data processing systems, which have fewer components or perhaps more components, may also be used with embodiments of the invention disclosed hereinabove.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An apparatus for moving a pleated filter material through a filter preparation system, comprising:
    a pleat height index;
    one or more drive gears coupled with the pleat height index;
    peripheral teeth comprising the one or more drive gears; and
    a drive motor that turns the one or more drive gears.

2. The apparatus of claim 1, wherein the one or more drive gears receive the pleated filter material by way of a feed entrance that guides the pleated filter material from a pay-out.

3. The apparatus of claim 2, wherein the pay-out comprises one or more rolls of pleated filter material having different pleat heights.

4. The apparatus of claim 3, wherein the feed entrance includes side rails that optimally guide different widths of the pleated filter material to the one or more drive gears.

5. The apparatus of claim 1, wherein the pleat height index comprises a vertically oriented disc having the one or more drive gears disposed around the periphery of the disc.

6. The apparatus of claim 5, wherein the disc is coupled with an index motor in mechanical communication with an axle that rotate the pleat height index so as to change the vertical positions of the one or more drive gears with respect to the pleated filter material.

7. The apparatus of claim 1, wherein each of the one or more drive gears is free to rotate with respect to the pleat height index.

8. The apparatus of claim 1, wherein the peripheral teeth comprise each of the one or more drive gears are configured to engage with a pleat height comprising the pleated filter material so as to conduct the pleated filter material through the filter preparation system.

9. The apparatus of claim 8, wherein the peripheral teeth comprising any one of the one or more driver gears are configured to engage with a filter material having a pleat height of 5/16".

10. The apparatus of claim 8, wherein the peripheral teeth comprising any one of the one or more driver gears are configured to engage with a filter material having a pleat height of 7/16".

11. The apparatus of claim 8, wherein the peripheral teeth comprising any one of the one or more driver gears are configured to engage with a filter material having a pleat height of 5/8".

12. The apparatus of claim 8, wherein the peripheral teeth comprising any one of the one or more driver gears are configured to engage with a filter material having a pleat height of 7/8".

13. The apparatus of claim 8, wherein the peripheral teeth comprising any one of the one or more driver gears are configured to engage with a filter material having a pleat height of 1¼".

14. The apparatus of claim 8, wherein the peripheral teeth comprising any one of the one or more driver gears are configured to engage with a filter material having a metric pleat height.

15. The apparatus of claim 1, wherein each of the one or more drive gears includes a pulley portion that receives a drive belt that is driven by a drive motor.

16. The apparatus of claim 15, wherein the drive motor turns all of the one or more drive gears simultaneously.

17. The apparatus of claim 16, wherein the drive belt is coupled with a tensioner that maintains an optimal belt tension during operation of the drive gears.

18. The apparatus of claim 1, wherein the pleat height index includes an engagement driver that moves the pleat height index vertically to engage and disengage a bottom-most of the one or more drive gears from the pleated filter material.

19. The apparatus of claim 18, wherein the engagement driver comprises a linear servo.

20. The apparatus of claim 19, wherein the engagement driver is configured to enable engaging an appropriately sized drive gear with pleated filter materials having different pleat heights.

* * * * *